United States Patent
Radi et al.

(10) Patent No.: US 12,379,951 B2
(45) Date of Patent: Aug. 5, 2025

(54) MEMORY COHERENCE IN VIRTUALIZED ENVIRONMENTS

(71) Applicant: Western Digital Technologies, Inc., San Jose, CA (US)

(72) Inventors: Marjan Radi, San Jose, CA (US); Dejan Vucinic, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 509 days.

(21) Appl. No.: 17/850,767

(22) Filed: Jun. 27, 2022

(65) Prior Publication Data

US 2023/0418642 A1    Dec. 28, 2023

(51) Int. Cl.
*G06F 9/455* (2018.01)
*G06F 9/54* (2006.01)
*G06F 12/0815* (2016.01)

(52) U.S. Cl.
CPC .......... *G06F 9/45558* (2013.01); *G06F 9/545* (2013.01); *G06F 12/0815* (2013.01); *G06F 2009/45579* (2013.01); *G06F 2009/45583* (2013.01)

(58) Field of Classification Search
CPC .... G06F 9/4558; G06F 9/545; G06F 12/0815; G06F 2009/45579; G06F 2009/45583
See application file for complete search history.

(56) References Cited

U.S. PATENT DOCUMENTS

| | | | |
|---|---|---|---|
| 6,381,686 B1 | 4/2002 | Imamura | |
| 8,412,907 B1 | 4/2013 | Dunshea et al. | |
| 8,700,727 B1 | 4/2014 | Gole et al. | |
| 10,027,697 B1 | 7/2018 | Babun et al. | |
| 10,362,149 B2 | 7/2019 | Biederman et al. | |
| 10,530,711 B2 | 1/2020 | Yu et al. | |
| 10,628,560 B1 | 4/2020 | Siranni et al. | |

(Continued)

FOREIGN PATENT DOCUMENTS

| CN | 106603409 A | 4/2017 |
|---|---|---|
| CN | 112351250 A | 2/2021 |

(Continued)

OTHER PUBLICATIONS

Bijlani et al.; "Extension Framework for File Systems in User space"; Jul. 2019; Usenix; available at: https://www.usenix.org/conference/atc19/presentation/bijlani.

(Continued)

*Primary Examiner* — Wissam Rashid
(74) *Attorney, Agent, or Firm* — Barry IP Law, P.C.

(57) ABSTRACT

A Virtual Switching (VS) kernel module manages different flows of packets between at least one Virtual Machine (VM) running at a node and one or more other VMs running at the node or at one or more other nodes in a network. A packet is received from a first VM using the VS kernel module and is parsed to identify a memory message and an address for at least one memory block stored in a shared memory. At least one entry for the at least one memory block is updated in a directory in a kernel space using the VS kernel module based on the memory message. According to another aspect, a state for the at least one memory block is determined from the directory and the VS kernel module is used to respond to the memory request based on the determined state.

20 Claims, 6 Drawing Sheets

(56) References Cited

U.S. PATENT DOCUMENTS

| | | | |
|---|---|---|---|
| 10,706,147 | B1 | 7/2020 | Pohlack |
| 10,754,707 | B2 | 8/2020 | Tamir et al. |
| 10,757,021 | B2 | 8/2020 | Man et al. |
| 11,134,025 | B2 | 9/2021 | Billore et al. |
| 11,223,579 | B2 | 1/2022 | Lu |
| 11,360,899 | B2 | 6/2022 | Radi et al. |
| 2002/0143843 | A1 | 10/2002 | Mehta |
| 2005/0257263 | A1 | 11/2005 | Keohane et al. |
| 2006/0101466 | A1 | 5/2006 | Kawachiya et al. |
| 2007/0067840 | A1 | 3/2007 | Young |
| 2009/0249357 | A1 | 10/2009 | Chanda et al. |
| 2010/0161976 | A1 | 6/2010 | Bacher |
| 2011/0126269 | A1 | 5/2011 | Youngworth |
| 2012/0198192 | A1 | 8/2012 | Balasubramanian et al. |
| 2012/0207026 | A1* | 8/2012 | Sato .................. H04L 12/4641 370/392 |
| 2014/0143365 | A1 | 5/2014 | Guerin et al. |
| 2014/0283058 | A1 | 9/2014 | Gupta |
| 2015/0006663 | A1 | 1/2015 | Huang |
| 2015/0319237 | A1 | 11/2015 | Hussain et al. |
| 2015/0331622 | A1 | 11/2015 | Chiu et al. |
| 2017/0163479 | A1 | 6/2017 | Wang et al. |
| 2017/0269991 | A1 | 9/2017 | Bazarsky et al. |
| 2018/0004456 | A1 | 1/2018 | Talwar et al. |
| 2018/0012020 | A1 | 1/2018 | Prvulovic et al. |
| 2018/0032423 | A1 | 2/2018 | Bull et al. |
| 2018/0060136 | A1 | 3/2018 | Herdrich et al. |
| 2018/0173555 | A1 | 6/2018 | Lutas |
| 2018/0191632 | A1 | 7/2018 | Biederman et al. |
| 2018/0341419 | A1 | 11/2018 | Wang et al. |
| 2018/0357176 | A1 | 12/2018 | Wang |
| 2019/0227936 | A1 | 7/2019 | Jang |
| 2019/0280964 | A1 | 9/2019 | Michael et al. |
| 2020/0034538 | A1 | 1/2020 | Woodward et al. |
| 2020/0201775 | A1 | 6/2020 | Zhang et al. |
| 2020/0274952 | A1 | 8/2020 | Waskiewicz et al. |
| 2020/0285591 | A1 | 9/2020 | Luo et al. |
| 2020/0322287 | A1 | 10/2020 | Connor et al. |
| 2020/0403905 | A1 | 12/2020 | Allen et al. |
| 2020/0409821 | A1 | 12/2020 | Terada et al. |
| 2021/0019197 | A1 | 1/2021 | Tamir et al. |
| 2021/0058424 | A1 | 2/2021 | Chang et al. |
| 2021/0103505 | A1 | 4/2021 | Tsuchiya |
| 2021/0149763 | A1 | 5/2021 | Ranganathan et al. |
| 2021/0157740 | A1 | 5/2021 | Benhanokh et al. |
| 2021/0240621 | A1 | 8/2021 | Fu et al. |
| 2021/0266253 | A1 | 8/2021 | He et al. |
| 2021/0320881 | A1 | 10/2021 | Coyle et al. |
| 2021/0377150 | A1 | 12/2021 | Dugast et al. |
| 2022/0035698 | A1 | 2/2022 | Vankamamidi et al. |
| 2022/0121362 | A1 | 4/2022 | Liu et al. |
| 2022/0294883 | A1 | 9/2022 | Pope et al. |
| 2022/0350516 | A1 | 11/2022 | Bono et al. |
| 2022/0357886 | A1 | 11/2022 | Pitchumani et al. |
| 2022/0414968 | A1 | 12/2022 | Wiegert et al. |

FOREIGN PATENT DOCUMENTS

| | | |
|---|---|---|
| EP | 3358456 A1 | 8/2018 |
| EP | 3598309 B1 | 5/2022 |
| KR | 1020190090331 A | 8/2019 |
| WO | 2018086569 A1 | 5/2018 |
| WO | 2018145725 A1 | 8/2018 |
| WO | 2021226948 A1 | 11/2021 |

OTHER PUBLICATIONS

Brad Fitzpatrick; "Distributed Caching with Memcached"; Aug. 1, 2004; Linux Journal; available at: https://www.inuxjournal.com/article/7451.

Roderick W. Smith; "The Definitive Guide to Samba 3"; 2004; APress Media; pp. 332-336; available at: https://link.springer.com/book/10.1007/978-1-4302-0683-5.

Wu et al.; "NCA: Accelerating Network Caching with express Data Path"; Nov. 2021; IEEE; available at https://ieeexplore.ieee.org/abstract/document/9680837.

Bachl et al.; "A flow-based IDS using Machine Learning in EBPF"; Cornell University; Feb. 19, 2021; available at https://arxiv.org/abs/2102.09980.

Caviglione et al.; "Kernel-level tracing for detecting stegomalware and covert channels in Linux environments"; Computer Networks 191; Mar. 2021; available at: https://www.researchgate.net/publication/350182568_Kernel-level_tracing_for_detecting_stegomalware_and_covert_channels_in_Linux_environments.

Dimolianis et al.; "Signature-Based Traffic Classification and Mitigation for DDOS Attacks Using Programmable Network Data Planes"; IEEE Access; Jul. 7, 2021; available at: https://ieeexplore.IEEE.org/stamp/stamp.jsp?amnumber=9511420.

Jun Li; "Efficient Erasure Coding In Distributed Storage Systems"; A thesis submitted in conformity with the requirements for the degree of Doctor of Philosophy Graduate Department of Electrical and Computer Engineering, Jniversity of Toronto; Nov. 2017; available at: https://tspace.library.utoronto.ca/bitstream/1807/80700/1/Li_Jun_201711_PhD_thesis.pdf.

Lakshmi J. Mohan; "Erasure codes for optimal performance in geographically distributed storage systems"; Apr. 2018; School of Computing and Information Systems, University of Melbourne; available at: https://minerva-access.unimelb.edu.au/handle/11343/215919.

Navarre et al.; "SRv6-FEC: Bringing Forward Erasure Correction to IPv6 Segment Routing"; SIGCOMM '21: Proceedings of the SIGCOMM '21 Poster and Demo Sessions; Aug. 2021; pp. 45-47; available at: https://dl.acm.org/doi/10.1145/3472716.3472863.

Van Schaik et al.; "RIDL: Rogue In-Flight Data Load"; Proceedings—IEEE Symposium on Security and Privacy; May 2019; available at: https://mdsattacks.com/files/ridl.pdf.

Xhonneux et al.; "Flexible failure detection and fast reroute using eBPF and SRv6"; 2018 14th International Conference on Network and Service Management (CNSM); Nov. 2018; available at: https://dl.ifip.org/db/conf/cnsm/cnsm2018/1570493610.pdf.

Zhong et al.; "Revisiting Swapping in User-space with Lightweight Threading"; arXiv:2107.13848v1; Jul. 29, 2021; available at: https://deepai.org/publication/revisiting-swapping-in-user-space-with-lightweight-threading.

Baidya et al.; "eBPF-based Content and Computation-aware Communication for Real-time Edge Computing"; IEEE International Conference on Computer Communications (INFOCOM Workshops); May 8, 2018; available at https://arxiv.org/abs/1805.02797.

Barbalace et al.; "blockNDP: Block-storage Near Data Processing"; University of Edinburgh, Huawei Dresden Research Center, Huawei Munich Research Center, TUM; Dec. 2020; 8 pages; available at https://dl.acm.org/doi/10.1145/3429357.3430519.

Blin et al.; "Toward an in-kernel high performance key-value store implementation"; Oct. 2019; 38th Symposium on Reliable Distributed Systems (SRDS); available at: https://ieeexplore.ieee.org/document/9049596.

Enberg et al.; "Partition-Aware Packet Steering Using XDP and eBPF for Improving Application-Level Parallelism"; ENCP; Dec. 9, 2019; 7 pages; available at: https://penberg.org/papers/xdp-steering-encp19.pdf.

Kicinski et al.; "eBPF Hardware Offload to SmartNICs: cls_bpf and XDP"; Netronome Systems Cambridge, United Kingdom; 2016; 6 pages; available at https://www.netronome.com/media/documents/eBPF_HW_OFFLOAD_HNiMne8_2_.pdf.

Kourtis et al.; "Safe and Efficient Remote Application Code Execution on Disaggregated NVM Storage with eBPF"; Feb. 25, 2020; 8 pages; available at https://arxiv.org/abs/2002.11528.

Wu et al.; "BPF for storage: an exokernel-inspired approach"; Columbia University, University of Utah, VMware Research; Feb. 25, 2021; 8 pages; available at: https://sigops.org/s/conferences/hotos/2021/papers/hotos21-s07-zhong.pdf.

Pending U.S. Appl. No. 17/561,898, filed Dec. 24, 2021, entitled "In-Kernel Caching for Distributed Cache", Marjan Radi.

Pending U.S. Appl. No. 17/571,922, filed Jan. 10, 2022, entitled "Computational Acceleration for Distributed Cache", Marjan Radi.

(56) References Cited

OTHER PUBLICATIONS

Pending U.S. Appl. No. 17/665,330, filed Feb. 4, 2022, entitled "Error Detection and Data Recovery for Distributed Cache", Marjan Radi.

Pending U.S. Appl. No. 17/683,737, filed Mar. 1, 2022, entitled "Detection of Malicious Operations for Distributed Cache", Marjan Radi.

Pending U.S. Appl. No. 17/741,244, filed May 10, 2022, entitled "In-Kernel Cache Request Queuing for Distributed Cache", Marjan Radi.

Tu et al.; "Bringing the Power of eBPF to Open vSwitch"; Linux Plumber 2018; available at: http://vger.kernel.org/pc_net2018_talks/ovs-ebpf-afxdp.pdf.

Pending U.S. Appl. No. 17/829,712, filed Jun. 1, 2022, entitled "Context-Aware NVMe Processing in Virtualized Environments", Marjan Radi.

Pfaff et al.; "The Design and Implementation of Open vSwitch"; Usenix; May 4, 2015; available at: https://www.usenix.org/conference/nsdi15/technical-sessions/presentation/pfaff.

Gao et al.; "OVS-CAB: Efficient rule-caching for Open vSwitch hardware offloading"; Computer Networks; Apr. 2021; available at:https://www.sciencedirect.com/science/article/abs/pii/S1389128621000244.

Pending U.S. Appl. No. 17/836,927, filed Jun. 9, 2022, entitled "Resource Allocation in Virtualized Environments", Marjan Radi.

Patterson et al.; "Computer Architecture: A Quantitative Approach"; 1996; Morgan Kaufmann; 2nd ed.; pp. 378-380.

maefeichen.com; "Setup the extended Berkeley Packet Filter (eBPF) Environment"; Maofei's Blog; Dec. 9, 2021; available at: https://maofeichen.com/setup-the-extended-berkeley-packet-filter-ebpf-environment/.

International Search Report and Written Opinion dated Oct. 25, 2022 from International Application No. PCT/US2022/030414, 11 pages.

International Search Report and Written Opinion dated Nov. 18, 2022 from International Application No. PCT/JS2022/030437, 10 pages.

Kang et al.; "Enabling Cost-effective Data Processing with Smart SSD"; 2013 IEEE 29th Symposium on Mass Storage Systems and Technologies (MSST); available at: https://pages.cs.wisc.edu/~yxy/cs839-s20/papers/SmartSSD2.pdf.

Sabella et al.; "Using eBPF for network traffic analysis"; available at: Year: 2018; https://www.ntop.org/wp-content/uploads/2018/10/Sabella.pdf.

Ghigoff et al, "BMC: Accelerating Memcached using Safe In-kernel Caching and Pre-stack Processing", In: 18th USENIX Symposium on Networked Systems Design and Implementation (NSDI 2021); p. 487-501; Apr. 14, 2021.

International Search Report and Written Opinion dated Sep. 30, 2022 from International Application No. PCT/US2022/029527, 9 pages.

Anderson et al.; "Assise: Performance and Availability via Client-local NVM in a Distributed File System"; the 14th USENIX Symposium on Operating Systems Design and Implementation; Nov. 6, 2020; available at: https://www.usenix.org/conference/osdi20/presentation/anderson.

Pinto et al; "Hoard: A Distributed Data Caching System to Accelerate Deep Learning Training on the Cloud"; arXiv; Dec. 3, 2018; available at: https://arxiv.org/pdf/1812.00669.pdf.

International Search Report and Written Opinion dated Oct. 7, 2022 from International Application No. PCT/US2022/030044, 10 pages.

\* cited by examiner

| Address | Node | VMs | State | Timestamp |
|---|---|---|---|---|
| A | 104A | 1A | E | 6/8/22; 10:04:02 |
| B | 104E | 2A | M | 6/8/22; 10:04:16 |
| C | 104A | 1A, 4B | S, S | 6/8/22; 09:03:17 |
| D | 104A | 2A, 3A | E, I | 6/7/22; 20:51:25 |
| E | 104A | 1A, 2B, 1C | M, I, I | 6/8/22; 10:05:07 |
| F | 104B | - | - | 6/7/22; 08:15:52 |
| ... | ... | ... | ... | ... |

MEMORY COHERENCE IN VIRTUALIZED ENVIRONMENTS

CROSS-REFERENCE TO RELATED APPLICATIONS

This application is related to U.S. application Ser. No. 17/561,898 titled "IN-KERNEL CACHING FOR DISTRIBUTED CACHE", filed on Dec. 24, 2021, which is hereby incorporated by reference in its entirety. This application is also related to U.S. application Ser. No. 17/571,922 titled "COMPUTATIONAL ACCELERATION FOR DISTRIBUTED CACHE", filed on Jan. 10, 2022, which is hereby incorporated by reference in its entirety. This application is also related to U.S. application Ser. No. 17/665,330 titled "ERROR DETECTION AND RECOVERY FOR DISTRIBUTED CACHE", filed on Feb. 4, 2022, which is hereby incorporated by reference in its entirety. This application is also related to U.S. application Ser. No. 17/683,737 titled "DETECTION OF MALICIOUS OPERATIONS FOR DISTRIBUTED CACHE", filed on Mar. 1, 2022, which is hereby incorporated by reference in its entirety. This application is also related to U.S. application Ser. No. 17/741,244 titled "IN-KERNEL CACHE REQUEST QUEUING FOR DISTRIBUTED CACHE", filed on May 10, 2022, which is hereby incorporated by reference in its entirety. This application is also related to U.S. application Ser. No. 17/829,712 titled "CONTEXT-AWARE NVMe PROCESSING IN VIRTUALIZED ENVIRONMENTS", filed on Jun. 1, 2022, which is hereby incorporated by reference in its entirety. This application is also related to U.S. application Ser. No. 17/836,927 titled "RESOURCE ALLOCATION IN VIRTUALIZED ENVIRONMENTS", filed on Jun. 9, 2022, which is hereby incorporated by reference in its entirety.

BACKGROUND

Current trends in cloud computing, big data, and Input/Output (I/O) intensive applications have led to greater needs for large-scale distributed shared memory systems. Virtualization of shared system resources, such as distributed memory, can generally improve scalability and increase the availability of memory resources for different applications running on Virtual Machines (VMs). Data center virtualization is becoming more widely used for distributed computational environments since virtualization can increase resource availability and isolation between different applications in the data center.

However, distributed caching and the pooling of memory resources among networked nodes running VMs in a data center presents a significant challenge in ensuring that the copies of memory blocks are coherent at the different VMs accessing the memory block. Although the simplicity of snooping-based cache coherence protocols has made them a prevailing choice, such snooping-based protocols typically require broadcasting memory messages to all the devices and cannot support the scalability requirements of larger scale systems due to increased latency and network traffic.

Directory-based cache coherence protocols can be used in some systems to provide a global view of each memory block's coherence state in the system by maintaining information regarding which device holds a particular memory block and in what status (e.g., invalid, modified). However, directory-based coherence protocols still present storage and maintenance processing problems (e.g., updating the directory for changes) as the system scales in physical size and/or virtual size. The storage overhead of the directory in terms of size and maintenance processing grows as the directory has to account for more VMs, more memory devices, more computation devices, and the states of more memory blocks in the system.

In addition, remote memory updates can introduce a relatively large delay by needing to wait for acknowledgements from memory endpoints that may be at other devices or nodes in the network. This can prevent applications from proceeding to a next step until receiving an acknowledgment from a memory endpoint, which increases memory access latency and reduces system throughput. With the advancing use of many-core systems and data center virtualization, there is a need for improved memory coherence in virtualized environments in terms of storage size, maintenance processing, and latency.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

FIG. 2 provides an example of an in-kernel directory according to one or more embodiments.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

Example Network Environments

Figure 1:
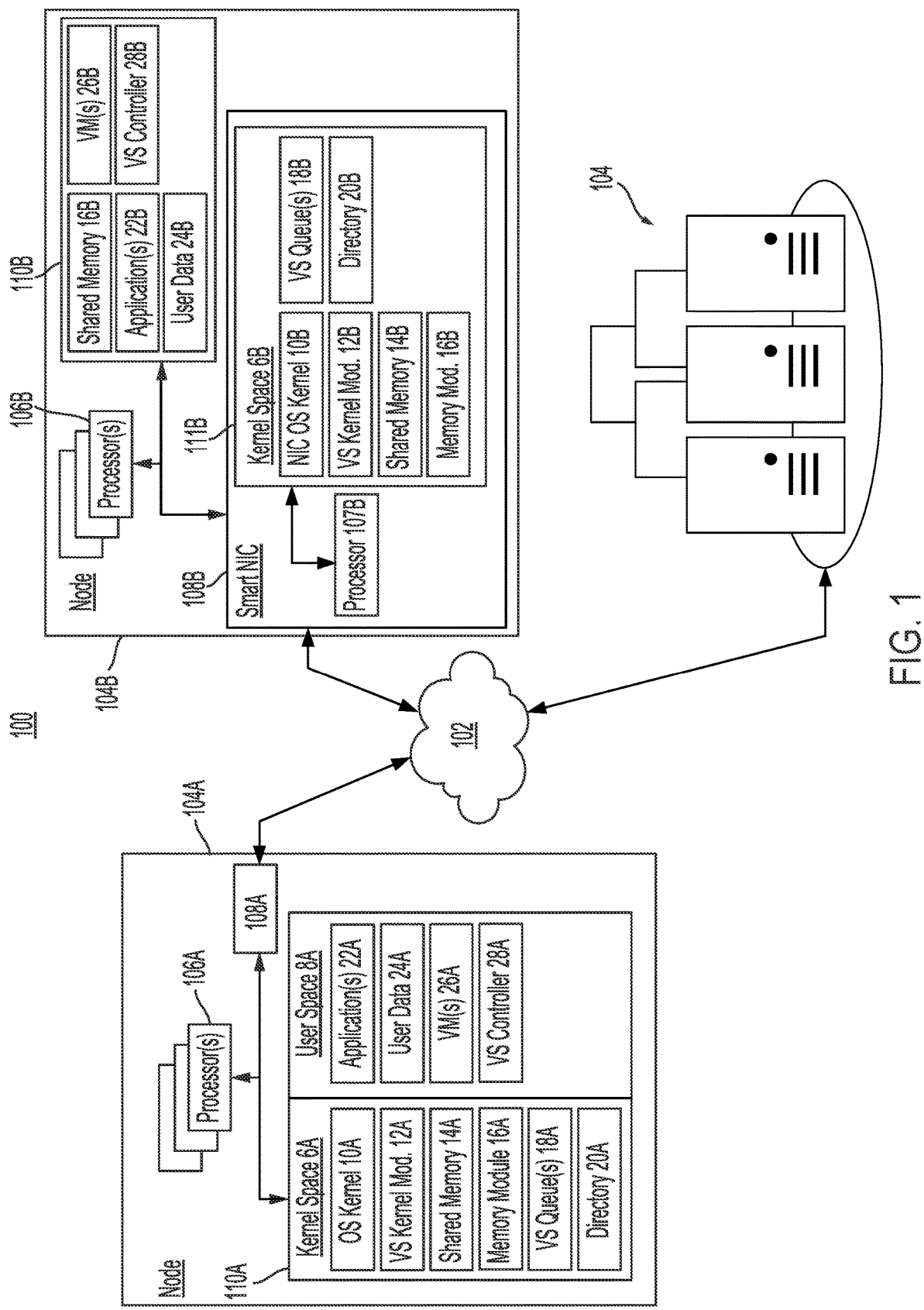
FIG. 1 is a block diagram of an example network environment for implementing virtualized memory coherence according to one or more embodiments.

FIG. 1 illustrates an example network environment 100 for implementing virtualized memory coherence according to one or more embodiments. As shown in FIG. 1, nodes 104 communicate with each other via network 102. Nodes 104 may function as, for example, servers or processing nodes and/or memory nodes. As a processing node or compute node, a node 104 can include one or more processors 106, such as Reduced Instruction Set Computer (RISC)-V cores or other type of Central Processing Unit (CPU) to process data, such as for a distributed application. As a memory node, a node 104 provides a shared memory that may be accessed by other nodes in network 102 and form part of a distributed memory system shared among nodes in network environment 100.

In some cases, some of nodes 104 may function as, for example, storage nodes that store data that can be accessed by nodes 104 and stored locally in a shared memory that forms part of the distributed memory system. In this regard, some of nodes 104 can include, for example, one or more rotating magnetic disks, and/or non-volatile solid-state memory, such as flash memory. In some implementations, a single node 104 may include one or more Solid-State Drives (SSDs) and/or Hard Disk Drives (HDDs). As discussed in more detail below, data retrieved from nodes or processed by nodes 104 can be cached or stored in respective shared memories 21 at nodes 104 that form the distributed memory to provide faster access to data as compared to retrieving data from storage devices of remote and/or local nodes 104.

In some implementations, network environment 100 in FIG. 1 may be used as at least part of a data center and/or for distributed processing, such as for distributed machine learning or big data analysis. As will be appreciated by those of ordinary skill in the art, nodes 104 are shown for the purposes of illustration, and network environment 100 can include many more nodes 104 than those shown in FIG. 1. In addition, those of ordinary skill the art will appreciate that network environment 100 can include more components than shown in FIG. 1, such as aggregated switches, Top of Rack (ToR) switches, and additional network controllers, for example.

Network 102 can include, for example, a Storage Area Network (SAN), a Local Area Network (LAN), and/or a Wide Area Network (WAN), such as the Internet. In this regard, nodes 104 may not be in the same geographic location. Nodes 104 may communicate using one or more standards such as, for example, Ethernet.

Each of nodes 104A and 104B in the example of FIG. 1 includes one or more processors 106, a network interface 108, and a memory 110. These components of nodes 104 may communicate with each other via a bus, which can include, for example, a Peripheral Component Interconnect express (PCIe) bus. In some implementations, nodes 104 may include NVMe® over Fabric (NVMe-oF™) nodes that are configured to communicate with other nodes 104 using NVMe messages (e.g., NVMe commands and responses) that may be, for example, encapsulated in Ethernet packets using Transmission Control Protocol (TCP). In this regard, network interfaces 108A and 108B of nodes 104A and 104B, respectively, may include Network Interface Cards (NICs), network interface controllers, or network adapters.

In the example of FIG. 1, node 104B includes smart NIC 108B as its network interface. As discussed in more detail below, smart NIC 108B includes its own processor 107B and memory 111B that can be used for managing different flows of packets between Virtual Machines (VMs), updating directory 20B, and/or responding to memory messages. The arrangement of using smart NIC 108B for the operations discussed herein can improve the performance of node 104B by offloading such operations from a processor 106B of node 104B to smart NIC 108B. In some implementations, smart NIC 108B may also serve as an NVMe controller for controlling operation of memory 110B, which can be an NVMe device.

As used herein, memory messages can refer to messages received from or sent to a VM concerning memory blocks stored in or to be stored in memory, such as a read request, a write request, a message granting or requesting a permission level for a memory block, or an acknowledgment of a memory operation. In addition, a memory block as used herein can refer to byte-addressable data, such as a cache line.

Processors 106 and 107B in FIG. 1 can execute instructions, such as instructions from one or more user space applications (e.g., applications 22) loaded from memory 110 or 111B, or from an Operating System (OS) kernel 10. Processors 106 and 107B can include circuitry such as, for example, a CPU, a Graphics Processing Unit (GPU), a microcontroller, a Digital Signal Processor (DSP), an Application-Specific Integrated Circuit (ASIC), a Field Programmable Gate Array (FPGA), one or more RISC-V cores, hard-wired logic, analog circuitry and/or a combination thereof. In some implementations, processors 106 and 107B can include a System on a Chip (SoC), which may be combined with a memory 110 or 111B, respectively.

Memories 110 and 111B can include, for example, a volatile Random Access Memory (RAM) such as Static RAM (SRAM), Dynamic RAM (DRAM), or a non-volatile RAM, or other solid-state memory that is used by processors 106 or 107B. Data stored in memory 110 or memory 111B can include data read from another node 104, data to be stored in another node 104, instructions loaded from an application or from an OS for execution by the processor, and/or data used in executing such applications, such as user data 24.

While the description herein refers to solid-state memory generally, it is understood that solid-state memory may comprise one or more of various types of memory devices such as flash integrated circuits, NAND memory (e.g., Single-Level Cell (SLC) memory, Multi-Level Cell (MLC) memory (i.e., two or more levels), or any combination thereof), NOR memory, EEPROM, other discrete Non-Volatile Memory (NVM) chips, or any combination thereof. In other implementations, memory 110 or 111B may include a Storage Class Memory (SCM), such as, Chalcogenide RAM (C-RAM), Phase Change Memory (PCM), Programmable Metallization Cell RAM (PMC-RAM or PMCm), Ovonic Unified Memory (OUM), Resistive RAM (RRAM), Ferroelectric Memory (FeRAM), Magnetoresistive RAM (MRAM), 3D-XPoint memory, and/or other types of solid-state memory, for example.

Memory 110A of node 104A includes a kernel space 6A that is used by OS kernel 10A and a user space 8A that is used by one or more user space applications 22A, one or more Virtual Machines (VMs) 26A, and Virtual Switching (VS) controller 28A. Kernel space 6A and user space 8A can include separate portions of virtual memory mapped to physical addresses in memory 110A. As will be understood by those of ordinary skill in the art, access to kernel space 6A is generally restricted to OS kernel 10A, its kernel extensions, and other portions of an OS, such as device drivers, while access to user space 8A is available to applications 22A, VMs 26A, and VS controller 28A, in addition to the OS. In this regard, the OS of node 104A or the OS of smart NIC 108B allocates hardware and software resources, such as memory, network, and processing resources of the device. In addition, and as discussed in more detail in related application Ser. No. 17/836,927 incorporated by reference above, VS controllers 28 in a user space can allocate resources for different applications in some implementations, such as by setting memory request rates or allocating other resources for the applications based on flow metadata generated by VS kernel modules 12.

As shown in FIG. 1, kernel space 6A includes OS kernel 10A, VS kernel module 12A, shared memory 14A, memory module 16A, one or more VS queues 18A, and directory 20A. In implementations where the OS of node 104A is Linux®, memory module 16A can include an extended Berkely Packet Filter (eBPF) program executed as an extension of the Linux kernel (Linux® is the registered trademark of Linus Torvalds in the U.S. and other countries). Notably, eBPF can enable reprogramming of the kernel behavior without requiring changes to the kernel source code or loading a kernel module. In addition, eBPF includes a verifier to ensure safe execution of eBPF programs. In some implementations, certain functions of VS kernel module 12A, such as updating directory 20A and/or responding to memory messages, can be performed by an eBPF program attached to VS kernel module 12A.

VS kernel module 12A can be used by the kernel to handle requests received from VMs 26A in user space 8A to communicate with other VMs either locally at node 104A or at a different node, such as node 104B. In some implementations, VS kernel module 12A can include an Open vSwitch (OVS) kernel module and can provide a programmable or customizable configuration in the way packets are processed or for updating directory 20A and/or responding to memory messages. In other implementations, the directory updates and/or memory message responses can be accomplished with a separate module or program in the kernel space, such as an eBPF program attached to VS kernel module 12A.

As a virtual switch, VS kernel module 12A can use flow tables (e.g., match-action tables) and perform table lookup operations in kernel space 6A for requests received from VMs to identify a corresponding socket or port to send a packet for a request. The VS kernel module in the kernel can process packets in a kernel data path, and if the VS kernel module cannot find a match in its flow tables, the kernel path can pass the packet to the VS controller in the user space to process a new flow. The user space VS controller can then update the VS kernel module's data path tables so that subsequent packets for the flow can be processed in the kernel for faster processing. In some implementations, VS controller 28A can include an OVS controller or agent.

In node 104A, VS kernel module 12A can parse packets received from VMs and use VS queues 18A to route the packets to different VMs locally at node 104A or at a remote node in network 102. In addition, VS kernel module 12A can maintain and update directory 20A based on memory messages it identifies by parsing the packets. As noted above, the memory messages can include, for example, messages received from or sent to a VM concerning memory blocks stored in or to be stored in shared memory 14A, such as a read request, a write request, a message granting or requesting a permission level for a memory block, or an acknowledgment of a memory operation. In some implementations, directory 20A may also keep information concerning memory blocks stored in other shared memories at different nodes 104 that have been requested or otherwise accessed by VMs running on node 104A.

VS kernel module 12A can also perform other memory coherence operations, such as by serving as a serialization point for coherence and responding to requests for different permission levels to access memory blocks, invalidating copies of memory blocks, sending acknowledgments of memory operations (e.g., acknowledging modifications to memory blocks or changing a permission level of a VM to memory blocks). In addition, VS kernel module 12A can maintain the size of directory 20A within a threshold size, such as by implementing an eviction policy to remove entries from directory 20A corresponding to less recently accessed memory blocks. The size needed for directory 20A can be better managed by only tracking memory blocks that have been recently accessed by VMs, as opposed to all the memory blocks that may be stored in the shared memory.

By maintaining directory 20A in a kernel space and performing coherence operations in the kernel space, the latency of coherence operations is reduced since many of the memory messages can be processed without having to traverse a full network stack and full I/O stack of the kernel to finally be handled by an application in user space 8A. Moreover, VS kernel module 12A can perform the updates to directory 20A with less latency since it can parse packets from VMs to quickly identify memory messages and addresses for memory blocks. In some implementations, directory 20A can be a match-action table accessed by VS kernel module 12A that can provide for faster handling of memory messages at a near line rate as compared to conventional directories for memory coherence.

In addition, the storage size of directory 20A is better suited to the scalability of large-scale systems due to virtualization and/or physical size since the coherence domain for directory 20A can be reduced to memory blocks that are accessed by VMs running at node 104A, as opposed to all the memory blocks in the distributed memory system. The latency for responding to memory messages from VMs running at a remote node 104 are also improved since the memory messages received from remote nodes 104 can be quickly identified and acted upon by VS kernel module 12A in the kernel space.

In the example of FIG. 1, memory module 16A can enable OS kernel 10A to access data for the distributed memory system in shared memory 14A that is stored in kernel space 6A, as opposed to user space 8A. Data can be stored in shared memory 14A using memory module 16A to accelerate remote memory operations at a near line rate without requiring special hardware or changes to the kernel in the case where memory module 16A is an eBPF program. The remote memory operations, such as read requests and write requests, can be processed at an earlier point in the kernel, as opposed to having to traverse a full network stack and full I/O stack of the kernel to finally be handled by an application in user space 8A. For example, memory module 16A may operate at a lower block device driver layer in the I/O stack, without having to pass memory requests through higher layers in the I/O stack, such as a generic block layer and file system layer of the kernel. Similarly, memory module 16A may also operate at a lower network device driver layer in the network stack, without having to pass memory requests through higher layers of the network stack in the kernel, such as a network protocol layer and a socket layer of the kernel.

In this regard, kernel network and I/O stack processing is becoming more of a bottleneck in distributed memory systems due to faster interface standards, such as NVMe-oF, and the increasing bandwidths of network hardware. Storing data for the distributed memory in kernel space 6A and/or performing operations in kernel space 6A can enable OS kernel 10A to respond quicker on behalf of user space applications 22A. Although there is some development in allowing user space applications to bypass the kernel and have direct access to storage or memory devices, such as NVMe devices, such performance improvements will come at the cost of reimplementing complicated default kernel functions in user space. In contrast, the use of VS kernel module 12A in the kernel to update directory 20A and perform other cache coherence operations can be performed in the kernel without requiring changes to the kernel source code or reloading a kernel module.

In the example of FIG. 1, shared memory 14A can be used by memory module 16A to share data between kernel space 6A and user space 8A. In some implementations, shared memory 21A can include one or more eBPF maps that enable copies of data to be provided to applications 22A in user space 8A and to store data from applications 22A. Shared memory 14A can include a data structure, such as a Key Value Store (KVS) or a table, for example. The use of an eBPF map as shared memory 14A can enable different applications 22A in a user space 8A to concurrently access the data stored in the shared memory.

Node 104B differs from node 104A in the example of FIG. 1 in that node 104A uses a kernel space 6B of the memory 111B of its smart NIC 108B for updating directory 20B and performing other memory coherence operations, such as responding to permission requests and sending invalidation messages to VMs. As shown in FIG. 1, smart NIC 108B includes its own processor 107B and memory 111B that are used as a hardware offload from processors 106B for operations related to the distributed memory system and the data accessed in shared memory 14B. This arrangement can further improve the performance of node 104B by freeing up processing resources and memory for processors 106B.

Smart NIC 108B can include, for example, an SoC that includes both processor 107B and memory 111B. In the example of node 104B, smart NIC 108B includes its own NIC OS kernel 10B that allocates resources of smart NIC 108B and memory 110B. In some implementations, memory 110B is an NVMe memory device that stores shared memory 14B for the distributed memory system in a kernel space of memory 110B and executes one or more user space applications 22B, one or more VMs 26B, and VS controller 28B in a user space of memory 110B. In some implementations, VS controller 28B can include an OVS controller or agent that can provide a programmable or customizable configuration. Each of the one or more VMs 26B can run one or more user space applications 22B and use VS controller 28B to interface with VS kernel module 12B in kernel space 6B. In addition, user space applications 22B can access user data 24B for performing tasks in the user space.

Each of NIC OS kernel 10B, VS kernel module 12B, shared memory 14B, memory module 16B, one or more VS queues 18B, and directory 20B is stored in a kernel space of memory 111B. In implementations where the NIC OS 10B is Linux, memory module 16B can include an eBPF program that is executed as an extension of the Linux kernel.

VS kernel module 12B can be used by the kernel to handle packets received from VMs 26B to communicate with other VMs either locally at node 104B or at a different node, such as node 104A. In some implementations VS kernel module 12B can include, for example, an OVS kernel module that can provide a programmable or customizable configuration in the way packets are processed and for the memory coherence operations disclosed herein. In other implementations, the memory coherence operations can be accomplished with a separate module or program in the kernel space, such as an eBPF program attached to VS kernel module 12B. As a virtual switch, VS kernel module 12B can use flow tables (e.g., match-action tables) and perform table lookup operations in kernel space 6B according to requests received from VMs to identify different sockets or ports for routing the requests.

Shared memory 14B can be used by memory module 16B to share data between a kernel space and a user space. In some implementations, shared memory 14B can include one or more eBPF maps that enable copies of data to be provided to applications 22B in user space and to store data from applications 22B. Shared memory 14B can include a data structure, such as a KVS or a table, for example. The use of an eBPF map as shared memory 14B can enable different applications 22B in a user space to concurrently access the data stored in the shared memory.

Those of ordinary skill in the art will appreciate with reference to the present disclosure that other implementations may include a different number or arrangement of nodes 104 than shown in the example of FIG. 1. In this regard, network environment 100 shown in FIG. 1 is for the purposes of illustration, and those of ordinary skill in the art will appreciate that network environment 100 may include many more nodes 104, and additional components, such as routers and switches, than shown in the example of FIG. 1.

In addition, those of ordinary skill in the art will appreciate with reference to the present disclosure that the modules, programs, and data structures shown in FIG. 1 may differ in other implementations. For example, node 104A or smart NIC 108B can include a different number of modules than shown in FIG. 1, such as in implementations where different programs may be used for maintaining directories 20 and performing memory coherence operations. As another example variation, each node 104 can include additional programs executed in a kernel space for performing other operations, such as for generating flow metadata or performing computational operations for the distributed memory system like data compression, data encryption, scatter-gather operations, and/or data deduplication.

FIG. 2 provides an example of directory 20A according to one or more embodiments. In the example of FIG. 2, directory 20A may be a single data structure or may be formed of multiple data structures stored in kernel space 6A. In some implementations, directory 20A can include a match-action table, such as part of a flow table used by VS kernel module 12A for routing packets or a separate match-action table that is accessed by VS kernel module 12A. In other implementations, directory 20A can include a KVS or other type of data structure.

As shown in FIG. 2, directory 20A includes addresses for different memory blocks stored in memory 110A and in other shared memories at different nodes 104 in the distributed memory system. Directory 20A tracks the state of the memory blocks, which comprises the status of the memory block at different VMs accessing a copy of the memory block (e.g., invalid, modified, shared, or exclusive). For each address or entry (i.e., row in directory 20A in FIG. 2), the node 104 storing the corresponding memory block (e.g., one or more cache lines) is indicated, in addition to an indication of VMs that have a copy of the memory block, one or more permissions or statuses for the memory block at the different VMs accessing the memory block, and a timestamp for when the memory block was last accessed by a VM running at either node 104 or at a different node 104. In some implementations, a status for the memory block in the shared memory may also be indicated.

In the implementation shown in FIG. 2, the status of the memory block in the shared memory is inferred by the statuses of the other copies of the memory block. For example, the status of the memory block in the shared memory may be inferred as shared when the other copies of the memory block are shared at one or more VMs or if there are no VMs with access to a copy of the memory block. The status of the memory block in the shared memory may be invalid when there is another copy of the memory block at a VM in a modified or exclusive status.

In FIG. 2, memory blocks corresponding to addresses A, C, D, and E are stored in shared memory 14A at node 104A, as indicated in the node column. Node 104A is considered a home node for these memory blocks since they are stored in shared memory 14A at node 104A. Memory blocks corresponding to addresses B and F, on the other hand, are stored in shared memories located at nodes 104E and 104B, respectively, which are considered the home nodes for these memory blocks.

As shown in the example of FIG. 2, a copy of the memory blocks corresponding to addresses A and B are currently accessed by VMs 1A and 2A, respectively, in addition to main memory blocks for addresses A and B, which are stored in shared memory at nodes 104A and 104E, respectively. Since the home node for the memory block corresponding to address B is a different node, directory 20A may only include an indication of VMs accessing this memory block that are running at node 104A and may not include indications of VMs accessing this remote memory block from other nodes.

In contrast, directory 20A includes the indications of all the VMs, local and remote, that access the memory block corresponding to address A, since this memory block is stored locally at node 104A. In this regard, VS kernel module 12A at node 104A serves as a serialization point in maintaining coherence or tracking the state of the memory blocks stored in shared memory 14A at node 104A. Similarly, other VS kernel modules, such as VS kernel module 12B, executed at other nodes 104 serve as serialization points for the memory blocks stored at its local shared memory. This arrangement can facilitate a distributed coherence protocol that is scalable and can provide quicker responses to memory messages than a global directory for the distributed memory system due to the directories' locations in the kernel data paths used to access the location where the original memory blocks are stored (i.e., the kernel data paths of the home node).

The state for the memory block indicated by address A is exclusive (i.e., E in FIG. 2), meaning that VM 1A running at node 104A has exclusive access or permission to modify the memory block. Even though VM 1A has exclusive access to modify the memory block for address A, VM 1A may not end up modifying the memory block in some cases, such as if the memory block was prefetched but ultimately not modified by VM 1A. Since the memory block for address A is stored at node A, directory 20A indicates whether there are other VMs that store a copy of the memory block for address A. In this case, VM 1A has the only copy of the memory block since it is the only VM listed for the memory block and directory 20A is at the home node 104A that stores the original copy of the memory block.

The timestamp for the memory block corresponding to address A indicates a last time the memory block was accessed by VM1. In this regard, different nodes in the distributed memory system may not be exactly synchronized with each other. The kernel data path of the home node is used as a serialization point for the memory blocks stored in its shared memory so that the timestamp in directory 20A for memory blocks stored in shared memory 14A indicates the time according to node 104A that the memory block was last accessed. For memory blocks that are stored at a different node, the timestamp can indicate the last time a VM at the local node (i.e., the node where the directory is stored) accessed the memory block. As discussed in more detail below, the timestamps can be used to keep the directory within a threshold size by removing entries for less recently accessed memory blocks. In addition, the size of directory 20A can be reduced as compared to conventional global directories by only tracking the states of memory blocks that have been more recently accessed by VMs, as opposed to including entries for every memory block stored in the shared memory.

In the example of directory 20A in FIG. 2, the state of the memory block indicated by address B is modified (i.e., M in FIG. 2), meaning that VM 2A running at node 104A has modified the memory block. As discussed in more detail below with reference to FIG. 3C, VM 2A will need to release its permission and provide the modified copy of the memory block back to shared memory 14A via VS kernel module 12A before other VMs can access the memory block since it has been modified. The timestamp for the memory block corresponding to address B is the last time that VM 2A accessed the memory block and no other VMs have a copy of the memory block since VM 2A is the only VM indicated in the entry for the memory block and the original memory block is stored at the same node as directory 20A.

The memory block corresponding to address C in directory 20A is being accessed by two VMs running at different nodes—VM 1A running at node 104A and VM 4B running at node 104B. As shown in the state column, each VM has a shared status (i.e., "S" in FIG. 2), which means that each VM has a read-only access to the memory block. In some implementations, a shared status may be indicated for both VMs with a single indication of the state in directory 20A instead of two indications since a shared status may only be granted when all other accessing VMs have a shared status.

The memory block corresponding to address D in directory 20A is being accessed by two VMs running at node 104A—VM 2A and VM 3A. As shown in FIG. 2, VM 2A has exclusive access to modify or write to the memory block and VM 3A has an invalid copy of the memory block. In this regard, when another VM has a modified or exclusive status for a memory block, the other VMs that have copies of the memory block have an invalid status. The timestamp for the memory block indicates a time when VM 2A was granted exclusive access to the memory block.

The memory block corresponding to address E in directory 20A is being accessed by thee VMs running at three different nodes—VM 1A running at node 104A, VM 2B running at node 104B, and VM 10 running at node 104C. Since directory 20A is at the same node 104A as the location of the shared memory for the original copy of the memory block, directory 20A tracks which VMs in network environment 100 have a copy of the memory block and their respective states for the memory block. In the example of FIG. 2, the copy of the memory block at VM 1A has a modified status, and the copies of the memory block at VMs 2B and 10 have an invalid status since a copy of the memory block has been modified by VM 1A. VMs 2B and 10 therefore cannot use the memory block until the state of the memory block has been updated to account for the modification by VM 1A.

The memory block corresponding to address F in directory 20A is stored in a shared memory of node 104B (e.g., shared memory 14B in FIG. 1), but is not currently being accessed by any VMs at node 104A where directory 20A is stored. In this regard, directory 20A may retain information in entries for memory blocks stored at other nodes after they have been accessed by a VM at the node, such as to improve a lookup process for where to obtain a recently accessed memory block stored at a different node. The timestamp for the memory block corresponding to address F can indicate the last time the memory block was accessed by a VM at the local node.

As will be appreciated by those of ordinary skill in the art, directory 20A may include different information than shown in FIG. 2. For example, some implementations of directory 20A may include usage statistics for different memory blocks, such as flow metadata, or may not include a separate indication of the memory device storing the memory block since this may be indicated by the address for the memory block. In some implementations, the state in directory 20A may only indicate whether a modification of the memory block is in progress, as opposed to a shared, modified, or exclusive status. As another example variation, different memory blocks with contiguous addresses may be consolidated in directory 20A by representing the memory blocks as a range of addresses, so long as the respective information (e.g., node location, VMs accessing the memory blocks, state, and timestamp) remain the same for all memory blocks in the address range.

Figure 3A:
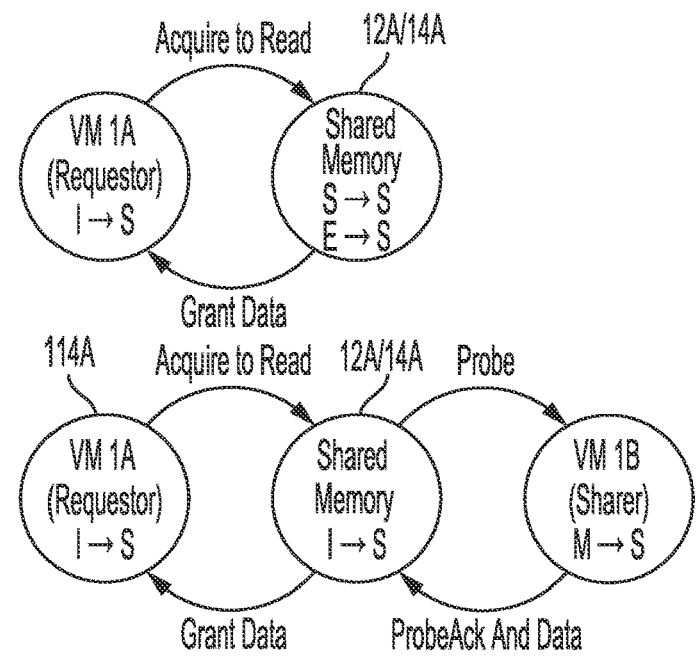
FIG. 3A provides state diagrams for the acquisition of a memory block to be read by a Virtual Machine (VM) according to one or more embodiments.
Figure 3B:
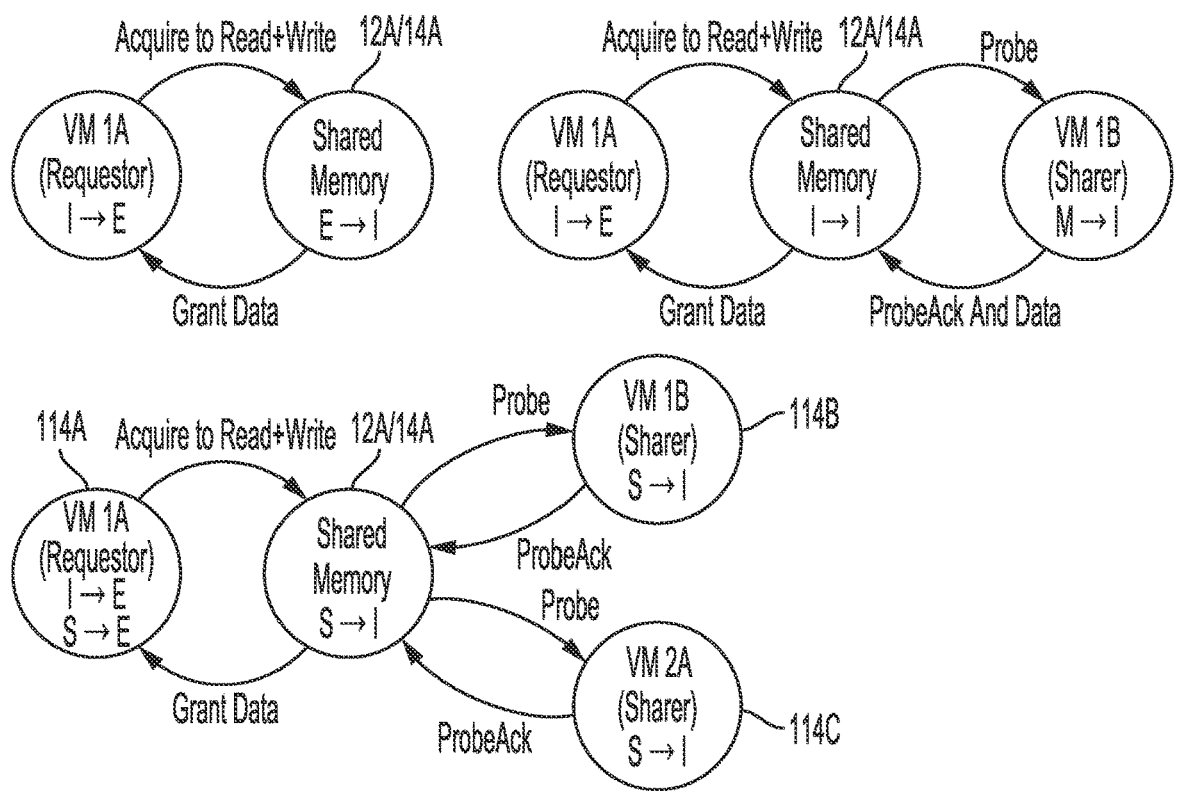
FIG. 3B provides state diagrams for the acquisition of a memory block to be written by a VM according to one or more embodiments.
Figure 3C:
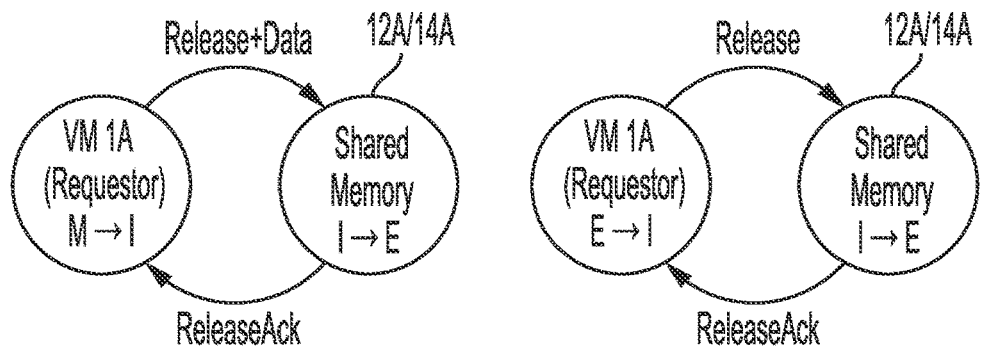
FIG. 3C provides state diagrams for the release of a permission level from a VM according to one or more embodiments.

FIGS. 3A to 3C provide example state diagrams for maintaining the coherency of memory blocks across the distributed memory system. As discussed below, a VS kernel module in a kernel space can perform memory coherence operations to set the states for different copies of memory blocks being accessed by different VMs. The VS kernel module can identify a memory message pertaining to a memory block by parsing a packet received from a VM. The packets that include memory messages may follow a packet format including one or more fields indicating a permission level requested by a VM to perform an operation using a requested memory block or memory block the VM may already have a copy of.

FIG. 3A illustrates the acquisition of one or more memory blocks to be read by a VM according to one or more embodiments. As shown in the top half of FIG. 3A, VM 1A serves as a requestor that sends a memory block request to VS kernel module 12A to acquire one or more memory blocks to read from shared memory 14A. The intended operation of VM 1A on the requested data can be provided with the packet as part of the request using a particular packet protocol. VM 1A may implement the packet protocol using, for example, memory module 16 and/or VS kernel module 12A executed by a processor 106A.

In FIG. 3A, the permission level of VM 1A for the requested memory block(s) or the state of the requested memory block(s) is changed by VS kernel module 12A from an invalid status to a shared status. This is shown in FIG. 3A with the permission level of VM 1A with respect to the requested memory block(s) changing from I to S after VS kernel module 12A has granted the request and shared memory 14A has provided the requested memory block(s) to VM 1A using, for example, memory module 16A in FIG. 1. VS kernel module 12A also changes the status of the original copy in shared memory 14A, if needed. In this regard, VS kernel module 12A represents the shared memory 14A since it is responsible for tracking the state of the memory blocks being accessed in shared memory 14A. Since the original copy of the requested memory block(s) was already in a shared status, the status of the memory block(s) remains shared.

VS kernel module 12A receives the memory block request from VM 1A and either maintains a shared permission level (i.e., S in FIG. 3A) with respect to the requested data or changes its permission level with respect to the requested data from exclusive to shared (i.e., E to S in FIG. 3A) to indicate that the shared memory no longer has read and write permission for the requested data. The shared status indicates that the VM has read-only permission to the data, that the data is valid and clean (i.e., does not have a more recent modified version at another VM), and that other VMs may also have a read-only copy of the data. The exclusive status also indicates that the requested data is valid and clean, but that the VM with the exclusive status is the only VM in network environment 100 that has read and write permission for the data.

In the bottom half of FIG. 3A, shared memory 14A has an initial status of invalid for the requested data, meaning that a VM has exclusive access or a modified copy of the requested data. In this case, VM 1B has a copy of a requested memory block that is in a modified status. In response to receiving a memory request from VM 1A to acquire one or more memory blocks to read including the memory block modified by VM 1B, VS kernel module 12A probes VM 1B. The probe from VS kernel module 12A forces a change in the permission level of VM 1B with respect to the requested data. Specifically, the status for the requested memory block at VM 1B changes from modified to shared (i.e., M to S in FIG. 3A) to relinquish permission to the requested memory block. VM 1B sends the modified version of the memory block back to VS kernel module 12A for storage in shared memory 14A with an acknowledgement of the probe. VS kernel module 12A and shared memory 14A then provide VM 1A with the requested data and permission to read the data. In response, VM 1A changes its status for the requested memory block from invalid to shared (i.e., I to S in FIG. 3A).

As noted above, the present disclosure uses a VS kernel module to maintain the directory for its respective shared memory. This ordinarily provides an efficient way to maintain directories 20 for a distributed memory system, since the VS kernel module receives the packets from the different VMs attempting to access the shared memory, which is also in the kernel space. The VS kernel module 12 can update its directory 20 based on the memory messages it receives for its shared memory 14 with less communication being needed among other nodes. Using the VS kernel module to update a local in-kernel directory also improves scalability of the distributed memory system, since each VS kernel module is responsible for only the memory blocks being accessed in its shared memory by the VMs.

FIG. 3B provides example state diagrams for when VM 1A requests one or more memory blocks to be modified. In the top left example state diagram of FIG. 3B, VM 1A as the requestor requests data from shared memory 14A for both reading and writing. Shared memory 14A, which has the only copy of the requested memory block or memory blocks, has its status for the requested data changed by VS kernel module 12A from exclusive to invalid (i.e., E to I in FIG. 5B), and provides the requested data to VM 1A. VS kernel module 12A changes the state for the requested data for VM 1A in directory 20A from invalid to exclusive to indicate that it is the only VM with permission to write or modify the requested data.

The top right example state diagram of FIG. 3B illustrates a case where shared memory 14A does not have the current copy of the requested memory block or blocks. When VS kernel module 12A receives the request from VM 1A to read and write to the requested data, VS kernel module 12A probes VM 1B for the requested data, which forces the permission level of VM 1B with respect to the requested data from modified to invalid (i.e., M to I in FIG. 3B). The modified or current version of the requested data is sent from VM 1B to VS kernel module 12A for storage in shared memory 14A with a probe acknowledgment. VS kernel module 12A forwards the requested data back to VM 1A and grants permission to modify the memory block or memory blocks. VS kernel module 12A then changes the state for VM 1A with respect to the requested data from invalid to exclusive (i.e., I to E in FIG. 3B) to indicate that it is the only VM with permission to modify the requested data.

The bottom example state diagram in FIG. 3B illustrates the case where client 114A requests data to modify that is being shared among clients 114B and 114C. Client 114A requests the data from memory device $110_1$, which sends probes for the data to clients 114B and 114C that are sharing copies of the requested data. In response, each of clients 114B and 114C change their status from shared to invalid (i.e., S to I in FIG. 5B) for the requested data and send an acknowledgement back to memory device $110_1$ that their permission level has been changed.

VS kernel module 12A then sends the requested data to VM 1A and grants permission to VM 1A to modify the data. The status of shared memory 14A in directory 20A with respect to the requested data changes from shared to invalid, while the state of VM 1A in directory 20A with respect to the requested data changes from either invalid to exclusive or shared to exclusive, depending on whether VM 1A was previously sharing the data with VMs 1B and 2A. In cases where VM 1A already was sharing the requested data, VS kernel module 12A may only send an indication that the permission level of VM 1A can be changed from shared to exclusive, since VM 1A already has a copy of the requested data.

FIG. 3C provides example state diagrams for the release of a permission level from VM 1A according to one or more embodiments. As shown in the example state diagram on the left side of FIG. 3C, VM 1A releases its permission level of modified data after writing to or modifying one or more memory blocks by sending an indication of its completion of writing and a copy of the modified data to VS kernel module 12A for storage in shared memory 14A. After receiving the modified memory block or memory blocks, VS kernel module 12A changes the permission level for shared memory 14A with respect to the data from invalid to exclusive and sends an indication of a release acknowledgment back to VM 1A. The state of VM 1A with respect to the memory block or memory blocks is changed in directory 20A from modified to invalid to indicate that VM 1A no longer has permission to modify or otherwise use the memory block.

In the example state diagram on the right side of FIG. 3C, VS kernel module 12A instead changes the permission level or status for VM 1A with respect to one or more memory blocks from exclusive to invalid. This can indicate that the memory block or memory blocks may not have been modified by VM 1A, but that the permission level or status for VM 1A has been changed to invalid so that another VM, such as a VM at the same node 104A or a different node 104, may modify the data. In this case, VM 1A sends an indication of the release of its permission level to VS kernel module 12A, which sends a release acknowledgment back to VM 1A. Shared memory 14A already has a current or valid copy of the data so there is no need for VM 1A to send its copy of the data. VS kernel module 12A then changes the state for shared memory 14A in directory 20A with respect to the data from invalid to exclusive to indicate that it has permission to modify the data, as opposed to any VMs in network environment 100.

As discussed above, VS kernel module 12A in the foregoing examples serves as a serialization point for the modification of the data stored in shared memory 14A. In other words, the order of performing requests for the same data is typically in the order that VS kernel module 12A receives requests for the data. VS kernel module 12A uses a non-blocking approach where memory requests are granted in the order in which they are received. In some implementations, VS kernel module 12A may delay additional requests received for data that is in progress of being modified and/or may send a request for a modified copy of the memory block(s) to the VM that has modified the data without having to wait for a request to retrieve the modified data from the VM.

Example Processes

Figure 4:
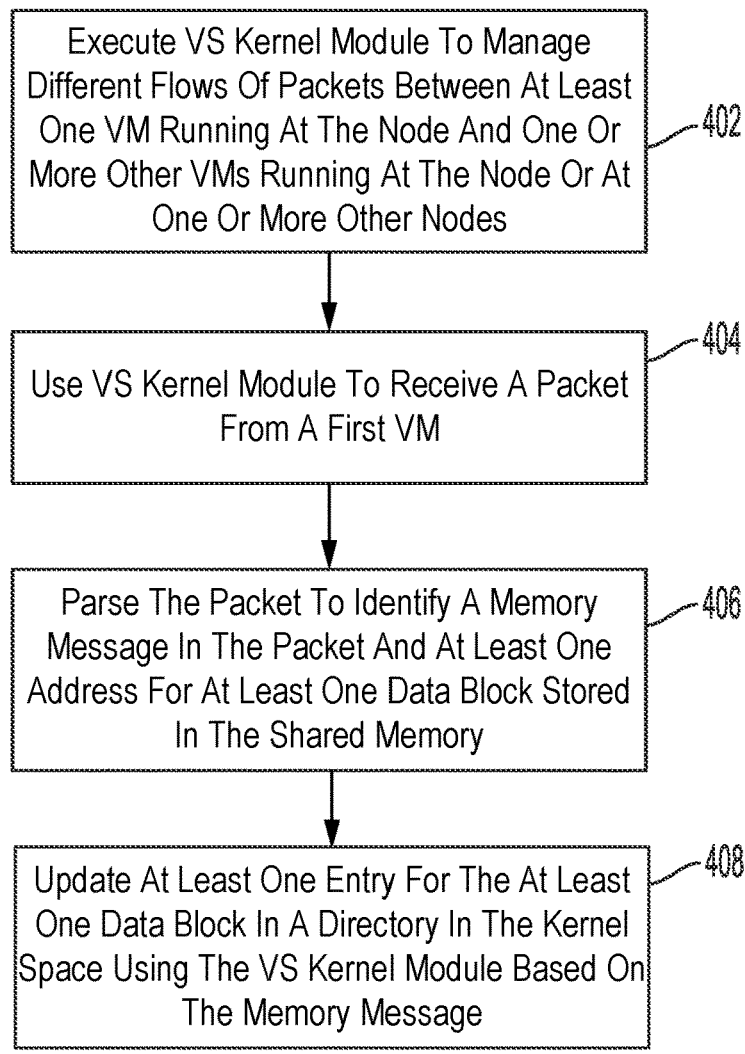
FIG. 4 is a flowchart for a directory update process according to one or more embodiments.

FIG. 4 is a flowchart for a directory update process according to one or more embodiments. The process of FIG. 4 can be performed by, for example, at least one processor 106A of node 104A in FIG. 1 executing VS kernel module 12A, or by at least one processor 106B of node 104B executing VS kernel module 12B.

In block 402, at least one processor of the node executes a VS kernel module to manage different flows of packets between at least one VM running at the node and or more other VMs running at the node or at one or more other nodes in communication with the node via a network. In some implementations, the VS kernel module can use different VS queues to queue packets received from one VM that are to be sent to another VM. In addition, the kernel space may also include one or more submission queues for accessing data in a shared memory stored in the kernel space, as described in more detail in application Ser. No. 17/836,927, which is incorporated by reference above. The packets may be received and sent to VMs running at the same node as the shared memory or may be received or sent to a VM running at a different node via a network interface of the node.

In block 404, the VS kernel module receives a packet from a first VM. The packet is parsed in block 406 to identify a memory message in the packet and an address for at least one memory block stored in the shared memory. As discussed above, the packets can include a field to indicate that the packet includes a memory message, such as an NVMe message. The VS kernel module may then further parse the memory message within the packet after determining that the packet includes a memory message to identify the address for the at least one memory block stored in the shared memory. The address for the at least one memory block may be identified using, for example, a match-action table or other data structure in the kernel.

In block 408, the kernel module updates at least one entry for the at least one memory block in a directory in the kernel space for the shared memory. The update can include, for example, changing a state in the directory for one or more VMs with access to a copy of the at least one memory block, such as changing the status for a VM from a shared status to an exclusive status and changing the status at another VM from a shared status to an invalid status. In other cases, the memory message may include modified data for the at least one memory block that is to be stored in the shared memory. After storing the modified data, the VS kernel module may access a completion queue indicating the store operation has been completed and change the entry in the directory from the modified status for the VM that sent the modified data to a shared status for the at least one memory block, for example. In this regard, the VS kernel module in the kernel space of the node that includes the shared memory can update the in-kernel directory more quickly than another component or module since the VS kernel module also queues and dequeues the memory messages and completion messages indicating the performance of a command in the shared memory.

In addition, and as discussed in more detail below with respect to the memory message response process of FIG. 5, the VS kernel module can handle memory messages relatively quickly by responding to VMs with acknowledgments and/or probe requests to release modified data back to the shared memory or to inform other VMs as to the change in the state of a memory block.

Those of ordinary skill in the art will appreciate with reference to the present disclosure that the directory update process of FIG. 4 may be performed in a different order. For example, the performance of blocks 402, 404, 406, and/or 408 may overlap as the VS kernel module is executed in block 402, while packets are being received in block 404 and other packets are being parsed in block 406, and the directory is updated in block 408.

Figure 5:
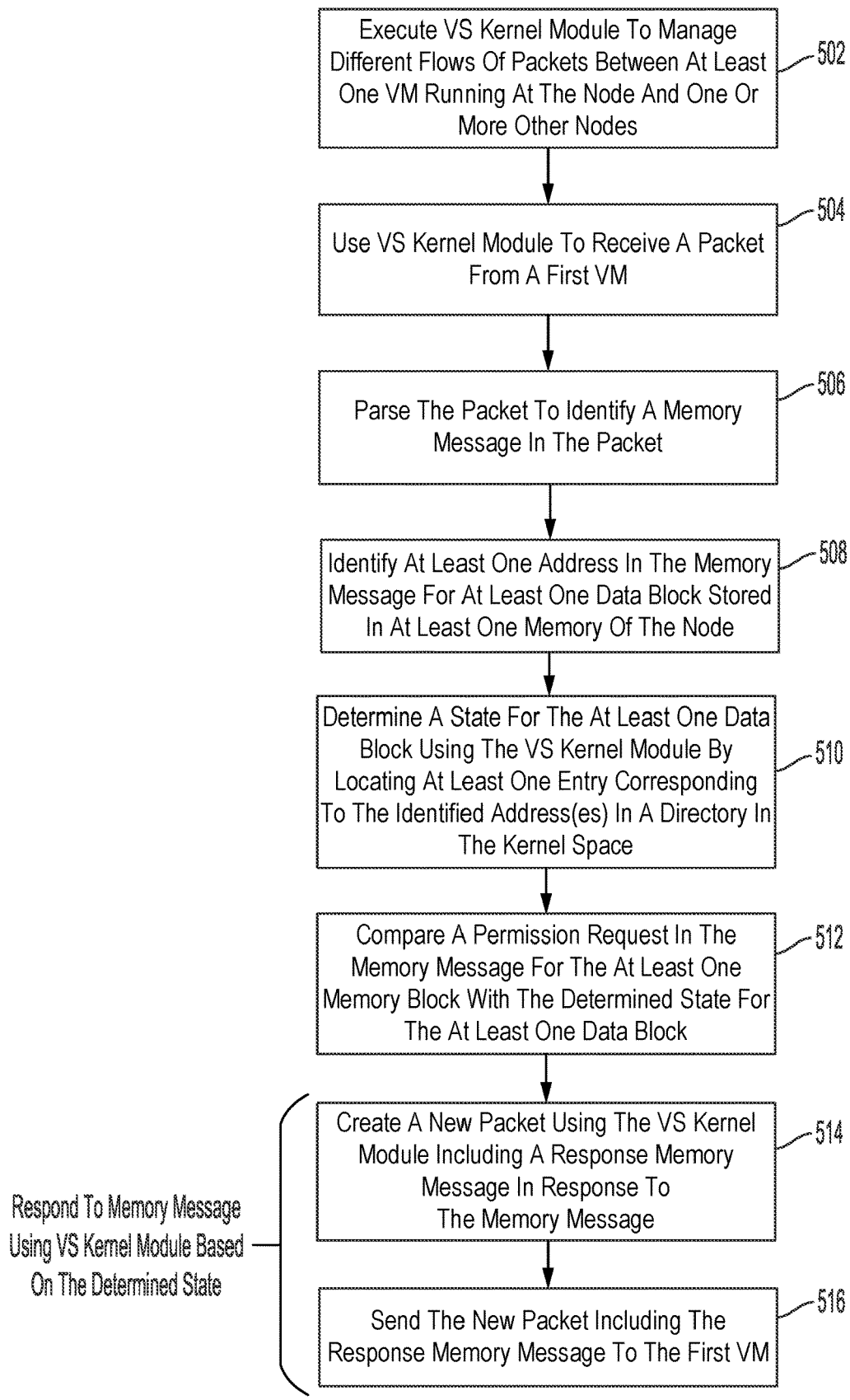
FIG. 5 is a flowchart for a memory message response process according to one or more embodiments.

FIG. 5 is a flowchart for a memory message response process according to one or more embodiments. The process of FIG. 5 can be performed by, for example, at least one processor 106A of node 104A in FIG. 1 executing VS kernel module 12A, or by at least one processor 106B of node 104B executing VS kernel module 12B.

The memory message response process of FIG. 5 may be performed in conjunction with the directory update process of FIG. 4 discussed above, depending on whether the identified memory message needs a response memory message to be sent to one or more VMs. In this regard, the description of blocks 502 and 504 in FIG. 5 can be provided with reference to the foregoing description of blocks 402 and 404 for FIG. 4 and this description is not repeated below.

In block 506, the packet received in block 504 from a VM is parsed to identify a memory message in the packet, such as an NVMe memory message to access data in a shared memory of the node. As discussed above, packets that include memory messages can have a field to indicate that the packet includes a memory message. In some implementations, a match-action table may be used so that further parsing of the memory message takes place in response to the identification of the memory message.

In block 508, the VS kernel module identifies at least one address in the identified memory message for at least one memory block stored in at least one memory of the node. In some implementations, the at least one address may correspond to one or more cache lines with entries in a directory stored in the kernel and maintained by the VS kernel module. As discussed above for the directory update process of FIG. 4, the VS kernel module may update the directory based on the identified memory message.

In block 510, a state for the at least one memory block is determined using the VS kernel module by locating at least one entry in a kernel space directory (e.g., directory 20A or 20B in FIG. 1) that corresponds to the identified address or addresses. The state can include, for example, a permission level or status for the at least one block at one or more VMs and/or in the at least one memory of the node. Examples of such states are provided above with reference to directory 20A in FIG. 2 and the state diagrams of FIGS. 3A to 3B.

Blocks 512 to 516 may be omitted in cases where the memory message does not include a permission request, such as when the memory message is an acknowledgment of a changed state received from a VM like the probe acknowledgments or release acknowledgments in FIGS. 3A to 3C discussed above. In such cases, there may only be an update of the directory in response to the memory message as in the directory update process of FIG. 4.

In cases where the memory message includes a permission request, such as to read or write data stored in the at least one memory, the VS kernel module compares the permission request in block 512 to the determined state for the at least one memory block. Although the coherence policy may be permissive in that memory requests are generally granted in the order in which they are received, the comparison in block 512 may still need to be performed to determine the state of the at least one memory block (e.g., whether other VMs have shared or modified copies of the at least one memory block), which may result in memory messages being sent to other VMs to change their permissions and/or release modified (i.e., dirty) data back to the VS kernel module before granting the permission request.

As shown in FIG. 5, blocks 514 and 516 can collectively comprise responding to the memory message using the VS kernel module based on the state determined for the at least one memory block. In block 514, the VS kernel module creates a new packet including a response memory message in response to the memory message identified in block 506. This can include adding one or more headers, for example, to a memory message, such as an NVMe memory message responding to the memory message received from the VM. In some cases, the response memory message can include data requested to be written or read or an indication of a status or permission for data already be accessed by the VM.

In block 516, the VS kernel module sends the new packet created in block 514 to the first VM that sent the packet received in block 504. In some implementations, the VS kernel module may queue the packet for transmission through one or more layers of the kernel to a VM running in a user space of the same node. In other cases, a VS controller or agent in the user space may receive the packet sent from the VS kernel module for the VM. In yet other cases, the packet created in block 514 may be queued for transmission by a network interface to another node that runs the first VM.

Those of ordinary skill in the art will appreciate with reference to the present disclosure that other implementations of the memory message response process of FIG. 5 may differ. For example, other implementations may combine the comparison in block 512 with the determination of the state for the at least one memory block in block 510.

Figure 6:
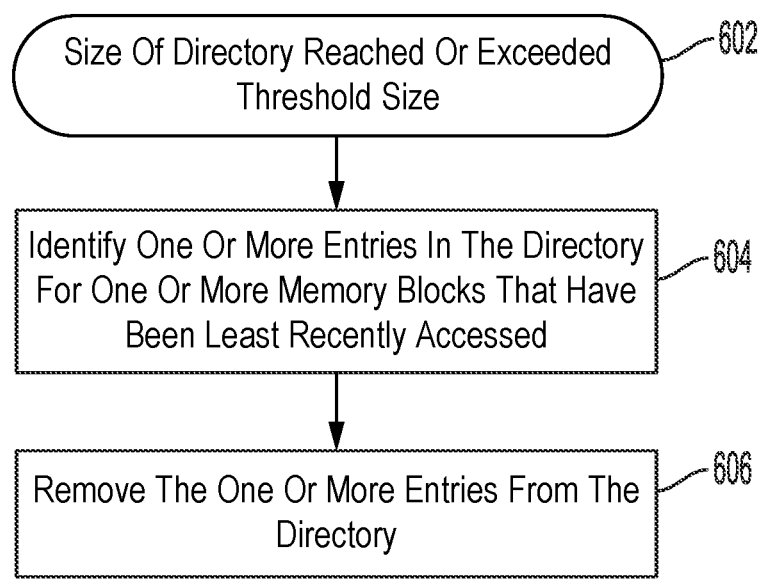
FIG. 6 is a flowchart for a directory size management process according to one or more embodiments.

FIG. 6 is a flowchart for a directory size management process according to one or more embodiments. The process of FIG. 6 can be performed by, for example, at least one processor 106A of node 104A in FIG. 1 executing VS kernel module 12A, or by at least one processor 106B of node 104B executing VS kernel module 12B.

In block 602, it is determined that the size of a directory stored in a kernel space of the node for data stored in at least one memory has reached or exceeded a threshold size. The threshold size may be set based on an allocated size for the directory, which may be based on the size of the at least one memory, such as a shared memory of the node.

In block 604, the VS kernel module identifies one or more entries in the directory for one or more memory blocks that have been least recently accessed. The identification of the entries may be performed by, for example, finding an oldest timestamp in the directory indicating the last time the associated memory block or memory blocks were last accessed.

In block 606, the VS kernel module removes the one or more identified entries from the directory to keep the size of the directory within the threshold size. As noted above with reference to the example directory of FIG. 2, the directory in some implementations may include entries for previously accessed memory blocks that are not stored locally at the node and may not be currently accessed by a VM running at the node. In some implementations, such entries may be prioritized for removal before other entries that may have been accessed less recently but are for memory blocks stored locally at the node.

After an entry for a memory block that is stored locally at the node has been removed from the directory, the state for the memory block becomes valid only for the original copy stored in the at least one memory or shared memory at the node. If the memory block is requested again by a VM, a new entry is created by the VS kernel module in the directory. In this way, the size of the directory is managed within the threshold size in the kernel space. In addition, the localized coherence management provided by directories in the kernel spaces of their respective nodes can provide a scalable memory coherence protocol that improves the memory consumption and latency problems otherwise found with global directories in distributed memory systems.

Those of ordinary skill in the art will appreciate with reference to the present disclosure that the foregoing directory size management process of FIG. 6 can vary in other implementations. For example, the performance of blocks 604 and 606 may repeat until the size of the directory is less than the threshold size.

The foregoing in-kernel directories and handling of memory coherence in the kernel by a virtual switch can improve the performance of maintaining memory coherence in larger virtual environments and/or in distributed memory systems. In one aspect, the response time for memory messages is improved by handling the memory coherence at a lower level in the kernel by the virtual switch that is receiving the packets from the VMs. In another aspect, network traffic is reduced by distributing the directories to the different nodes that store the memory blocks since updates and requests do not have to be sent to a separate device in the network that maintains the directory. The foregoing arrangement of in-kernel directories at the nodes also improves the scalability of the distributed memory system as more VMs and/or nodes access the memory and can allow for a localized control of the size of the directories.

Other Embodiments

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes processor or controller circuitry to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, processor circuitry, and controller circuitry described in connection with the examples disclosed herein may be implemented or performed with a general purpose processor, a GPU, a DSP, an ASIC, an FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. Processor or controller circuitry may also be implemented as a combination of computing devices, e.g., a combination of a DSP and a microprocessor, a plurality of microprocessors, an SoC, one or more microprocessors in conjunction with a DSP core, or any other such configuration.

The activities of a method or process described in connection with the examples disclosed herein may be embodied directly in hardware, in a software module executed by processor or controller circuitry, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable media, an optical media, or any other form of storage medium known in the art. An exemplary storage medium is coupled to processor or controller circuitry such that the processor or controller circuitry can read information from, and write information to, the storage medium. In the alternative, the storage medium may be integral to processor or controller circuitry. The processor or controller circuitry and the storage medium may reside in an ASIC or an SoC.

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive. In addition, the use of language in the form of "at least one of A and B" in the following claims should be understood to mean "only A, only B, or both A and B."

What is claimed is:

1. A node, comprising:
   at least one memory configured to be used, at least in part, as a shared memory in a distributed memory system in a network;
   a network interface configured to communicate with one or more other nodes in the network; and
   at least one processor configured, individually or in combination, to:
      execute a Virtual Switching (VS) kernel module in a kernel space of the at least one memory, the VS kernel module configured to manage different flows of packets between at least one Virtual Machine (VM) running at the node and one or more other VMs running at the node or at the one or more other nodes;
      receive a packet from a first VM using the VS kernel module;
      parse the packet to identify a memory message in the packet and an address for at least one memory block stored in the shared memory; and
      update an entry for the at least one memory block in a directory stored in the kernel space using the VS kernel module based on the memory message.

2. The node of claim 1, wherein the at least one processor is further configured, individually or in combination, to use the VS kernel module to update the directory by changing a state for the at least one memory block in a match-action table stored in the kernel space.

3. The node of claim 1, wherein the at least one processor is further configured, individually or in combination, to:
  determine that a size of the directory has reached or exceeded a threshold size; and
  in response to determining that the size of the directory has reached or exceeded the threshold size:
    identify at least one entry in the directory for one or more memory blocks that have been least recently accessed; and
    remove the at least one entry from the directory.

4. The node of claim 1, wherein the directory includes addresses for a plurality of memory blocks stored in the shared memory, states of the plurality of memory blocks stored in the shared memory, and indications of VMs accessing the plurality of memory blocks.

5. The node of claim 4, wherein the directory further includes at least one entry for one or more memory blocks stored in a different shared memory of another node in the network.

6. The node of claim 1, wherein the network interface includes a processor of the at least one processor that executes the VS kernel module.

7. The node of claim 1, wherein the at least one processor is further configured, individually or in combination, to use the VS kernel module to:
  create a new packet including a response memory message in response to the memory message identified in the received packet; and
  send the new packet including the response memory message to the first VM.

8. The node of claim 7, wherein the at least one processor is further configured, individually or in combination, to send the new packet via the network interface to a different node in the network that runs the first VM.

9. The node of claim 1, wherein the at least one processor is further configured, individually or in combination, to use the VS kernel module to:
  determine a state for the memory block by accessing at least one entry for the at least one memory block in the directory; and
  compare a permission request in the memory message with the determined state for the at least one memory block.

10. A method, comprising:
  executing a Virtual Switching (VS) kernel module in a kernel space of at least one memory of a node, the VS kernel module configured to manage different flows of packets between at least one Virtual Machine (VM) running at the node and one or more other VMs running at the node or at one or more other nodes in communication with the node via a network;
  receiving a packet from a first VM using the VS kernel module;
  parsing the packet to identify a memory message in the packet;
  identifying an address in the memory message for at least one memory block stored in the at least one memory;
  determining a state for the at least one memory block using the VS kernel module by locating at least one entry corresponding to the identified address in a directory stored in the kernel space; and
  responding to the memory message using the VS kernel module based on the determined state.

11. The method of claim 10, further comprising updating the at least one entry in the directory for the at least one memory block using the VS kernel module based on the response to the memory message.

12. The method of claim 10, wherein the directory includes a match-action table stored in the kernel space.

13. The method of claim 10, further comprising:
  determining that a size of the directory has reached or exceeded a threshold size; and
  in response to determining that the size of the directory has reached or exceeded the threshold size:
    identifying one or more entries in the directory for one or more memory blocks that have been least recently accessed; and
    removing the one or more entries from the directory.

14. The method of claim 10, wherein the directory includes addresses for memory blocks in a shared memory of the at least one memory, states of the memory blocks in the shared memory, and indications of VMs accessing the memory blocks in the shared memory, wherein the shared memory forms part of a distributed memory system in the network.

15. The method of claim 14, wherein the directory further includes one or more entries for one or more memory blocks stored in a different shared memory of another node in the network.

16. The method of claim 10, wherein a processor of a network interface of the node executes the VS kernel module.

17. The method of claim 10, further comprising:
  creating a new packet, using the VS kernel module, including a response memory message in response to the memory message identified in the received packet; and
  sending the new packet including the response memory message to the first VM.

18. The method of claim 10, further comprising using the VS kernel module to compare a permission request in the memory message for the at least one memory block with the determined state for the at least one memory block.

19. The method of claim 10, further comprising sending the response via the network to a different node in the network that runs the first VM.

20. A node, comprising:
  at least one memory configured to be used, at least in part, as a shared memory in a distributed memory system in a network;
  a network interface configured to communicate with one or more other nodes in the network; and
  means for:
    executing a Virtual Switching (VS) kernel module in a kernel space of the at least one memory, the VS kernel module configured to manage different flows of packets between at least one Virtual Machine (VM) running at the node and one or more other VMs running at the node or at the one or more other nodes;
    receiving a packet from a first VM using the VS kernel module;
    parsing the packet to identify a memory message in the packet and an address for at least one memory block stored in the shared memory; and
    updating a directory stored in the kernel space for the at least one memory block using the VS kernel module based on the memory message.

* * * * *